United States Patent [19]

Sturm et al.

[11] Patent Number: 5,235,336

[45] Date of Patent: Aug. 10, 1993

[54] METHOD OF BEARING DETERMINATION UTILIZING A BOTTOM ANTENNA IN AN AIRCRAFT TRACKING SYSTEM

[75] Inventors: Patricia K. Sturm, Phoenix; Gregory T. Stayton, Glendale, both of Ariz.

[73] Assignee: Honeywell Inc., Minneapolis, Minn.

[21] Appl. No.: 767,007

[22] Filed: Sep. 27, 1991

[51] Int. Cl.[5] .................. G01S 13/78; G01S 13/93
[52] U.S. Cl. ................................. 342/30; 342/37
[58] Field of Search ............................ 342/30, 37

[56] References Cited

U.S. PATENT DOCUMENTS

4,910,526  3/1990  Donnangelo et al. ........... 342/30 X
4,970,518  11/1990  Cole et al. ........................ 342/37

Primary Examiner—T. H. Tubbesing
Attorney, Agent, or Firm—A. A. Sapelli; W. Udseth; A. Medved

[57] ABSTRACT

In a Traffic Alert and Collision Avoidance System on an aircraft having a plurality of antennas, an optimal bearing value is obtained for each target aircraft by generating a target data block for each response to an interrogation, each target data block including a measured bearing value and an associated priority code. A priority code is assigned based on the antenna receiving the information, and the number of valid bearing measurements used to determine a measured bearing value for the reply. If more than one target data block is obtained in a surveillance period, one target data block is retained based on predetermined criteria. The measured bearing value of all the target data blocks having the same, highest priority code are selected or combined, the result being saved in the target data block. The priority codes are then used to select the proper reply bearing measurement, the bearing track update filtering parameters, and to aid in the reply qualification for bearing track initialization.

8 Claims, 7 Drawing Sheets

METHOD OF BEARING DETERMINATION UTILIZING A BOTTOM ANTENNA IN AN AIRCRAFT TRACKING SYSTEM

RELATED PATENT APPLICATION

The present application is related to U.S. Pat. Application, Ser. No. 07/585,325, now U.S. Pat. No. 5,107,268, entitled "Method of Multipath Track Reduction in an Aircraft Tracking System," by P. Sturm et al., filed on 20 Sep. 1990, and assigned to Honeywell Inc., the assignee of the present application.

BACKGROUND OF THE INVENTION

The present invention relates to an aircraft tracking system, and more particularly, to a method of utilizing information from a bottom antenna of an aircraft to determine bearing of other aircraft.

The increased demands placed o the aircraft flight deck as a result of more complex technology, ever increasing aircraft traffic, and increased demands for safety has brought about a requirement for monitoring of aircraft traffic in a vicinity of an aircraft that includes automatic identification of potential threats to the monitoring aircraft. As a result, aircraft can have transponders associated therewith that, in response to appropriate electromagnetic interrogation signals provide responding electromagnetic signals that can include information with respect to the range, altitude, and bearing of the interrogated aircraft. Certain traffic control system transponders, e.g., the mode-S system, include target identification as part of the information imposed on the responding electromagnetic signals. For these mode-S systems, the identification of the path or track of the responding aircraft is relatively simple, involving time dependent positions and altitudes of an identified aircraft. Similarly, extrapolations or extensions of aircraft tracks can be relatively simple.

In systems (such as the Air Traffic Control Radar Beacon System, ATCRBS) which do not include unique aircraft identification information, the determination of the aircraft tracks is more complicated. The information obtained by periodic interrogation of a multiplicity of unidentified targets, with associated range, altitude and bearing information being provided or determined as a result of the interrogation, can be subjected to well known algorithms to provide a target aircraft track. Once the track is identified, then the extension thereof can be computed to determine if the target aircraft is in the immediate vicinity and poses a threat to the monitoring aircraft.

Early Traffic Alert and Collision Avoidance Systems (TCAS) generally included a bottom omni-directional antenna, but usually did not include bottom directional antennas. In addition, however, many aircraft do include having a top directional antenna. Bottom directional antennas are being added to aircraft, and when the monitoring aircraft transmits an interrogation signal, a response can be received on both the top and bottom antennas. Although there is a "cone of silence" on the bottom antenna due to the antenna pattern, responses from the bottom directional antenna provide additional bearing coverage as a result of antenna elevation pattern and antenna location.

The operation of aircraft collision avoidance apparatus is governed by the Radio Technical Commission for Aeronautics (RTCA) Minimum Operational Performance Standards (MOPS) for Traffic Alert and Collision Avoidance System (TCAS) manual document number D0185. The MOPS document implies that all the bearing responses received from the top or bottom antennas are utilized equally. The preferred embodiment of the present invention categorizes and prioritizes the responses from the respective antennas, and utilizes the bearing measurements by priority to obtain the best bearing measurement possible.

The method of the present invention utilizes information received on the bottom antenna to improve the bearing reliability of the target aircraft by making use of the information from the bottom directional antenna. However, since the top antenna has more reliable information (the top antenna generally transmitting with more power, is subjected to fewer obstructions, and is less prone to multi-path interference, i.e., (false tracks), it is desirable to utilize the information received from the top antenna first rather than the bottom antenna. Thus, the method of the present invention includes a technique in which the bearing measurement is categorized and prioritized depending on whether the information utilized to generate the bearing measurement is received from the top antenna or the bottom antenna. It is still desirable to use the bottom antenna for bearing measurement to increase the bearing track coverage. The method of the present invention uses the best bearing measurement available in determining how to process the replies received from the antennas for track initiation, track extension, and track elimination. Overall, the method of the present invention results in an improved bearing measurement for the targets being tracked.

SUMMARY OF THE INVENTION

Thus there is provided by the present invention, a method for utilizing responses received by a monitoring aircraft on a bottom directional antenna, thereby improving the bearing reliability of the responding aircraft. An aircraft having a Traffic Alert and Collision Avoidance System (TCAS) includes a first and second antenna. The aircraft interrogates all target aircraft in the vicinity of the aircraft such that in a surveillance period a predefined algorithm is used to determine the number of interrogations made during an interrogation portion of the surveillance period. The interrogations are transmitted between the first antenna and the second antenna in a predefined manner. The target aircraft respond to each interrogation received such that the same target aircraft responds at least once during a surveillance period. This invention is a method for obtaining an optimal bearing value for each target aircraft comprising the steps of generating target data blocks for each response received, each target data block including a measured bearing value and an associated priority code. The generated target data blocks are stored in a response list. Upon completion of the interrogation portion of the surveillance period, the target data blocks are examined to determine those which relate to the same target. If only one target data block is found in the response list, that target block is retained. If more than one target data is found in the response list, one target data block retained in the response list based on predetermined criteria. The measured bearing value of all the target data blocks having the same, highest priority code are combined or to select the optimal bearing value. The resultant opti bearing value is stored in the retained target data along with the priority code of the measured bearing. The remainder of the target data blocks are examined until the response list contains only one target data block for responding target aircraft, each target data block having optimal bearing value for tracking each target aircraft.

Accordingly, it is an object of the invention to provide a method for improving the bearing measurement of a responding (target) aircraft.

It is another object of the present invention to provide a method for improving the bearing measurement of a responding aircraft utilizing information received on a bottom directional antenna.

It is still another object of the present invention to provide a method for improving the bearing measurement of a responding aircraft received on a bottom antenna wherein bearing information received is prioritized as a function of the receiving antenna and the amount of pulse data correlation.

These and other objects of the present invention will become more apparent when taken in conjunction with the following description and attached drawings wherein like characters indicate like parts, and which drawings form a part of the present application.

DETAILED DESCRIPTION

Figure 1:
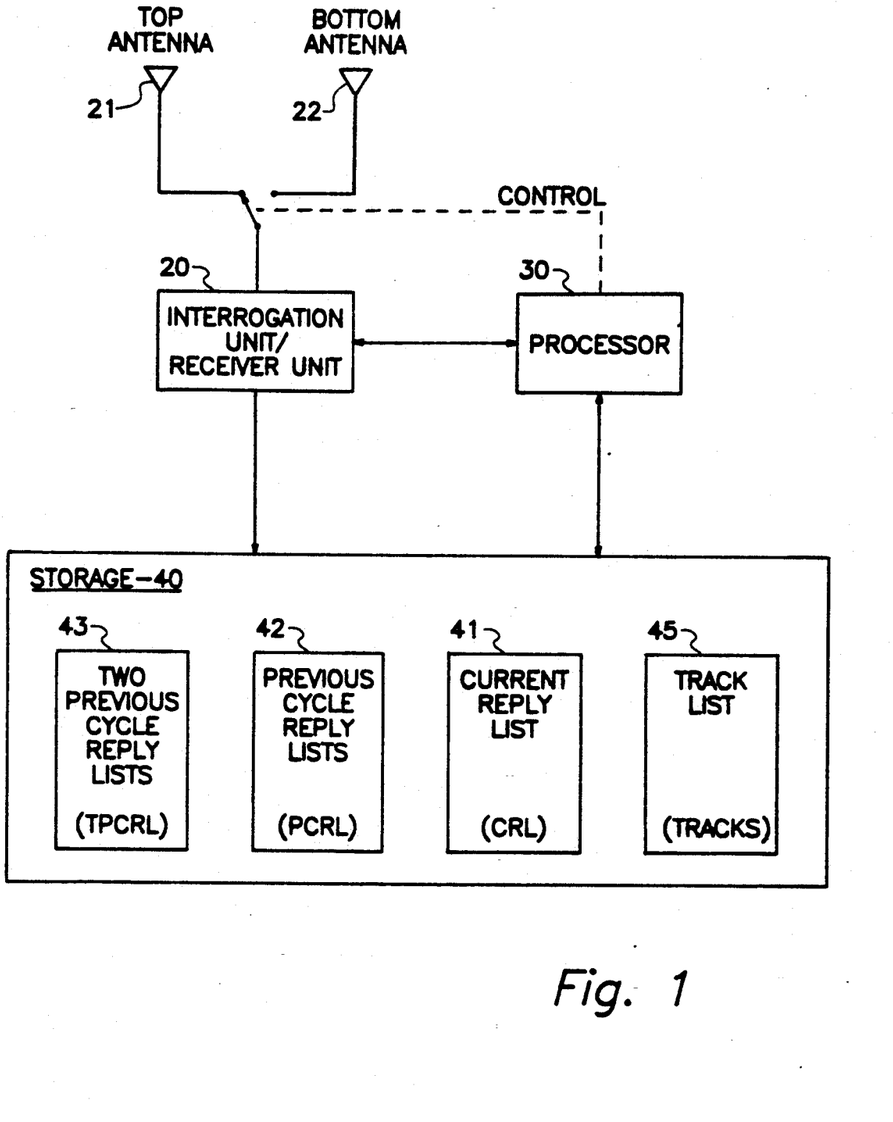
FIG. 1 shows a partial block diagram of a representative system in which the method of the present invention can be utilized.

Referring to FIG. 1, there is shown block diagram of a representative system in which the method of the present invention can be utilized. An interrogation unit 20 performs a predetermined interrogation sequence transmitting a predetermined pulse sequence, the pulses having varying power values, to a predetermined one of a plurality of antennas, in this example, a top antenna 21 or a bottom antenna 22 as controlled by a processor 30. Replies to the interrogations from a target aircraft, sometimes referred to as an intruder, are received by the respective antenna and processed by the processor 30. The results are coupled to and saved in a storage unit 40, in particular, the current reply list (CRL) 41. The CRL 41 includes processed data for each reply, which includes range, altitude, bearing, part of the preliminary processing includes filtering the raw replies utilizing known techniques such as Raw Reply Elimination. The elimination process utilizes techniques well knows, for example if an interrogation transmission is forward and the reply indicates the response is from the rear, this response is discarded (off axis reply) since it will more than likely duplicated when the interrogation is aft. The storage unit 40 is partitioned to include previous cycle reply lists (PCRL) 42 and a second list, two previous cycle reply lists (TPCRL) 43. These lists can be maintained by any standard technique well known in the art. A list of tracks is maintained in a separate list, tracks 45, the tracks being updated by any one of a variety of known techniques, or updated by the technique disclosed in the related application referenced above.

Figure 2:
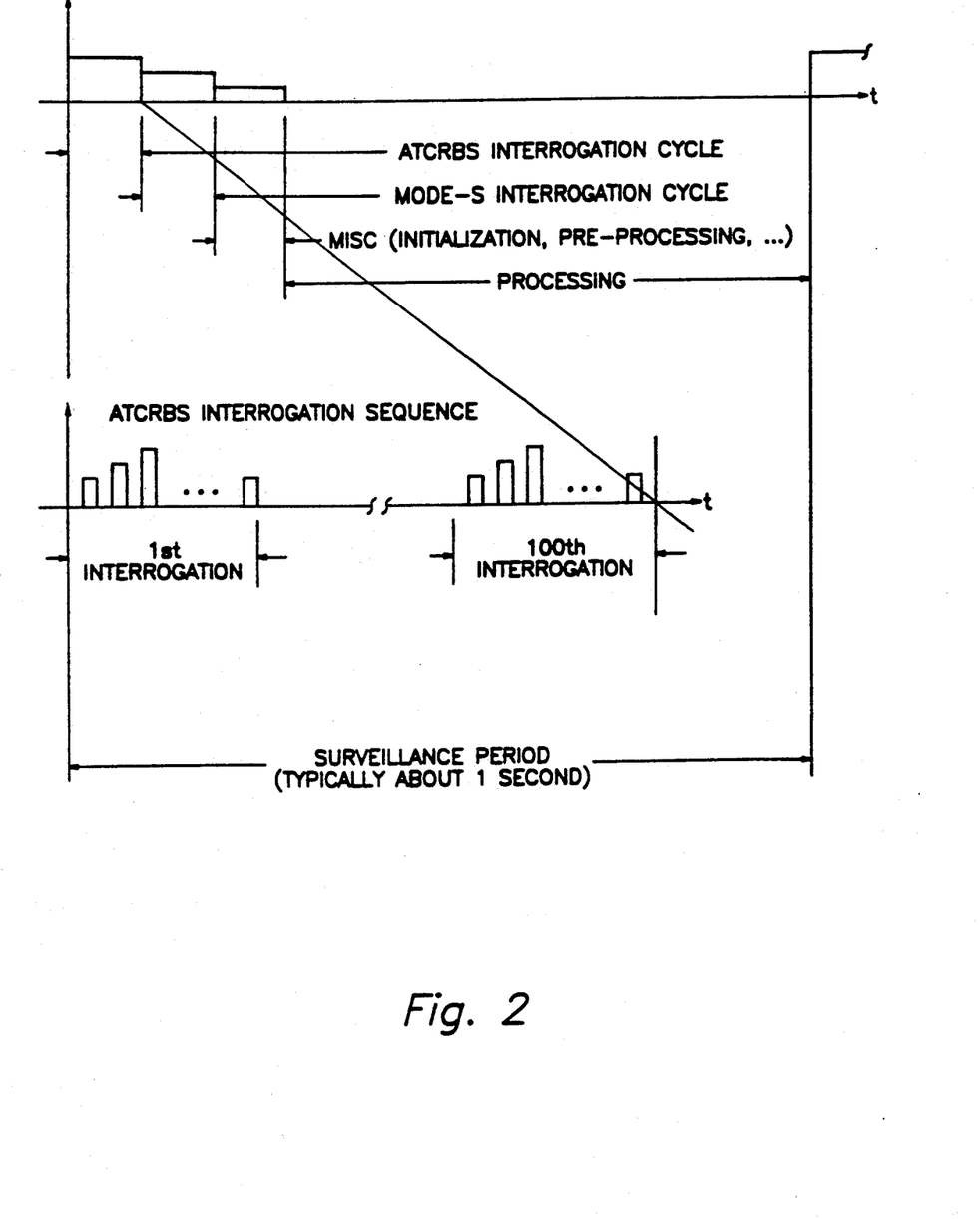
FIG. 2 shows a time line of a surveillance period.

Referring to FIG. 2, there is shown a time line of a typical surveillance period (or cycle), which is also utilized in the TCAS system of the preferred embodiment. The surveillance period of the preferred embodiment of the system is approximately 1 sec during which time an interrogation sequence is performed for the ATCRBS systems, mode S type interrogations take place, and finally the processing of the replies and tracks is performed. The TCAS system of the preferred embodiment of the system in which the present invention can be found uses a Whisper-Shoutmode of interrogation for ATCRBS intruders in which interrogation signals of different amplitude are used to interrogate the target aircraft transponders. Between the threshold of the transponders and the suppression of response when interrogation signals greater than a defined amplitude are received by the transponder, the Whisper-Shout mode provides for assistance in separation of target replies. The interrogation sequence of the preferred embodiment of the present invention will not be discussed further herein since it is not necessary to an understanding of the present invention.

After the interrogation sequence of a surveillance period is completed, the reply data is stored in the current reply list 41 (CRL) and reply elimination is completed, the updating process of targets begins. The next track in the track list is selected to be updated, the first time through the update processing, the next track is the first track. It will be understood by those skilled in the art that initially pointers, indexes,... are initialized the first time the processing starts in a surveillance period, the method utilized for maintaining and processing these lists canoe any method well known to those skilled in the art and is not critical to an understanding of the method of the present invention. Further information with respect to track update can be had by referring to the related application identified above.

Figure 3:
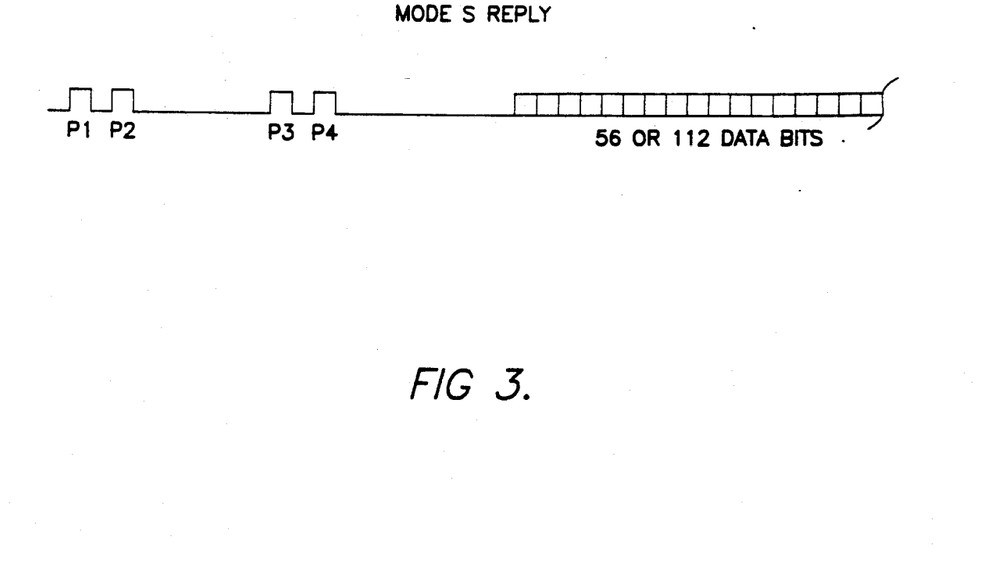
FIG. 3 shows a bit pattern of a Mode-S response.
Figure 4:
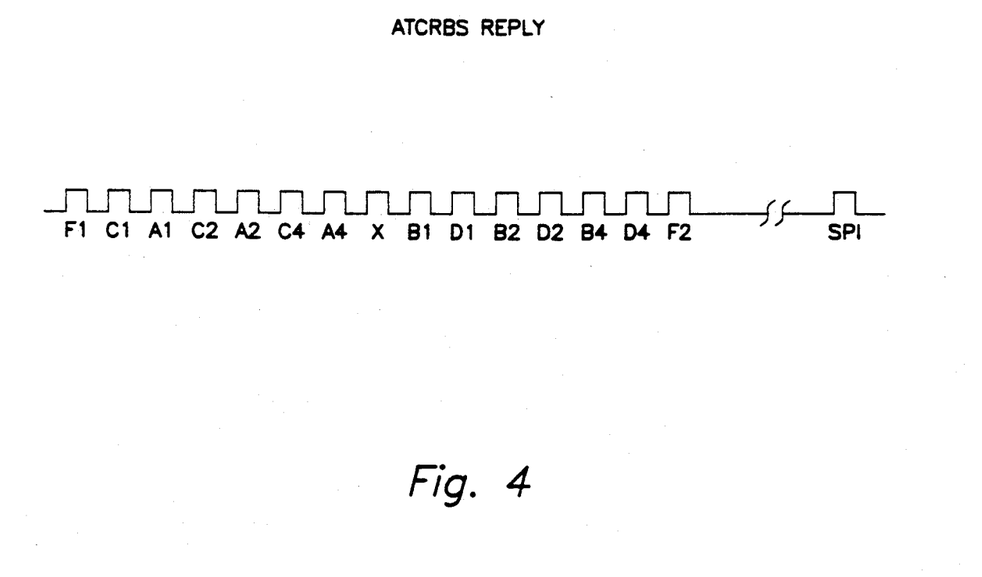
FIG. 4 shows a bit pattern of an ATCRBS response.

Referring to FIGS. 3 and 4, there is shown a bit pattern of a Mode-S and ATCRBS reply, respectively. The P1 through P4 preamble pulses of the Mode-S response are always present. The F1 and F2 pulses of the ATCRBS response are the framing pulses. The C1, A1,... pulses are the altitude information contained in the response of the target (responding) aircraft in a Mode C data, Gilham coded format altitude response. In the preferred embodiment of the present invention four classes of bearing are defined from highest to lowest priority as follows:

1) valid, top antenna bearing;
2) valid, high confidence, bottom antenna bearing;
3) valid, low confidence, bottom antenna bearing;
4) invalid bearing The directional antenna of the TCAS system of the preferred embodiment utilizes four receiver elements in which the centers of the field of view are spaced 90° apart. Bearing is determined using a ratio of the received power from the two receiver elements with the strongest received power. For each received reply, bearing is measured on up to four separate received pulses. In the case of ATCRBS intruders, bearing is always measured on the two framing pulses F1 and F2. In addition, bearing is measured on the first two valid, ungarbled data pulses received, if present (denoted V1 and V2). Therefore there are at least two and at most four bearing pulse measurements for each received signal. At least two bearing pulse measurements meeting the define criteria (e.g., within 10° of each other and ungarbled,...) are required to obtain a valid bearing value. In the case of Mode-S intruders, there are always four bearing measurements on the P1 through P4 preamble pulses. Three or more pulse bearing measurements within 10° of each other are required to obtain a valid bearing value.

Valid top antenna bearing is a valid bearing value from a top directional antenna regardless of the number of pulses used to determine the bearing value. Valid high confidence bottom antenna bearing is valid bearing from the bottom antenna in which at least three pulses bearing measurements were used to determine the bearing value. Low confidence, bottom antenna bearing is valid bearing from the bottom antenna in which less than three pulses were used to determine the bearing value. Invalid bearing is obtained when the pulse bearing measurements do not lead to a valid bearing value regardless of the receiving antenna. In the preferred embodiment of the present invention at least three bearing pulse measurements are required to obtain a valid Mode-S bearing value. Therefore in the preferred embodiment of the present invention, all valid Mode-S bearing values are high confidence. When the landing gear is down there is significant interference with bearing measurements from the bottom antenna. Thus bearing values from the bottom directional antenna when the landing gear is down are considered invalid.

Figure 5:
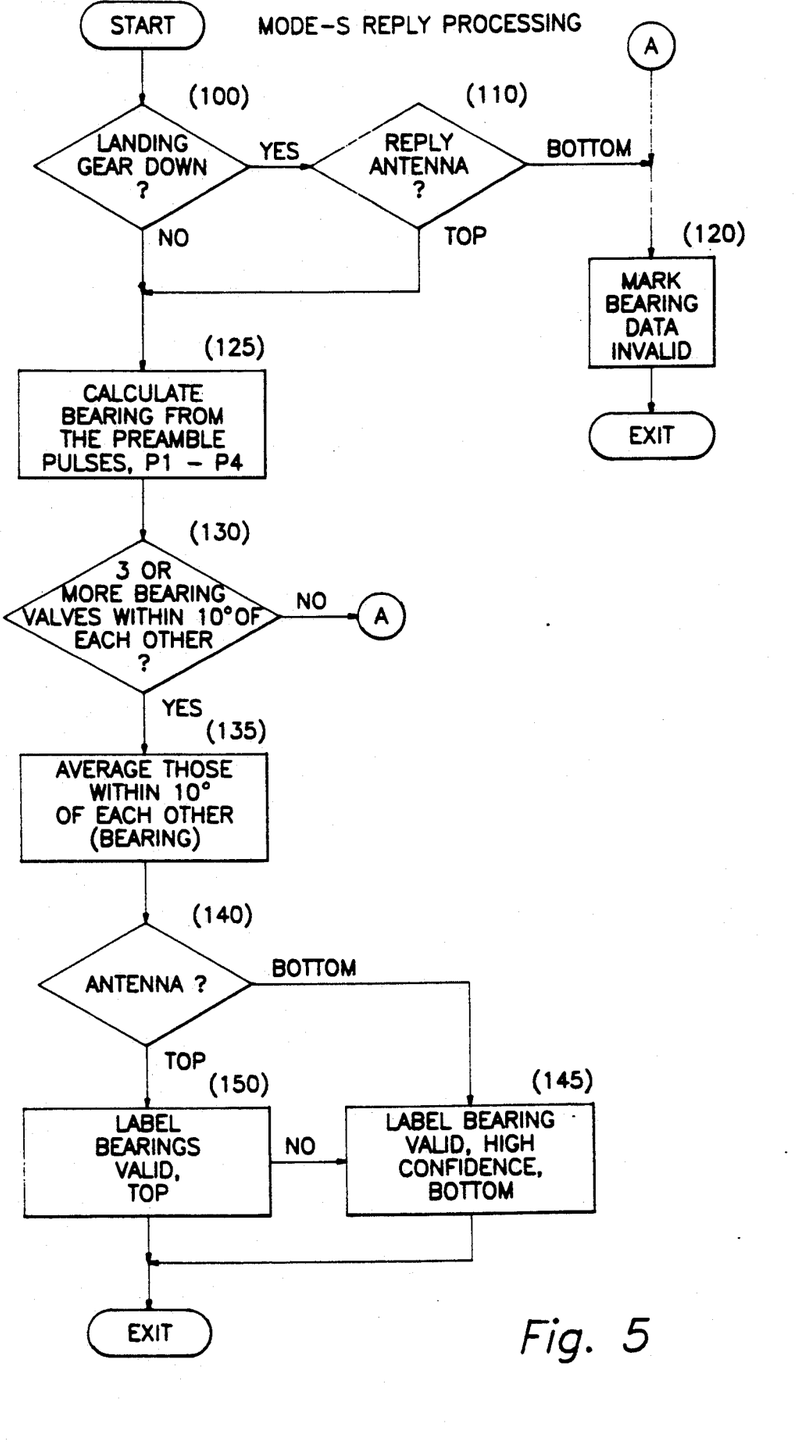
FIG. 5 shows a functional flow diagram of the Model-S reply processing.

Referring to FIG. 5 there is shown a functional flow diagram of the Mode-S reply processing. If the landing gear is down (block 100) and the reply is from the bottom antenna (block 110), then the bearing data is marked as invalid (block 120) and the reply processing is exited. Back at block 110 if the reply is from the top antenna, the reply data is utilized and bearing calculated therefrom, in particular, from the preamble pulses P1 through P4 (block 125). If three or more of the bearing values calculated from block 125 are within 10° of each other (block 130), these values (the three or four values from block 130) are averaged together and yield a single bearing value BEARING (block 135). If the antenna utilized was the bottom antenna (block 140) the value of bearing, BEARING, is labeled valid, high confidence, bottom (block 145). If the reply antenna was the top antenna (block 140), then the value of bearing, BEARING, is labeled valid top (block 150). Back at block 130 (if there are not three bearing values within 10° of each other), the bearing data is marked as invalid (block 120) and the process exited. It will be understood that the value of bearing, BEARING, along with the category/priority assigned thereto is available with the remaining data, altitude, range, ID (if available)... and any other information associated with the target and stored in the current reply list (CRL) 41 for the processing of the target information, i.e., the target update, as described above.

Figure 6A:
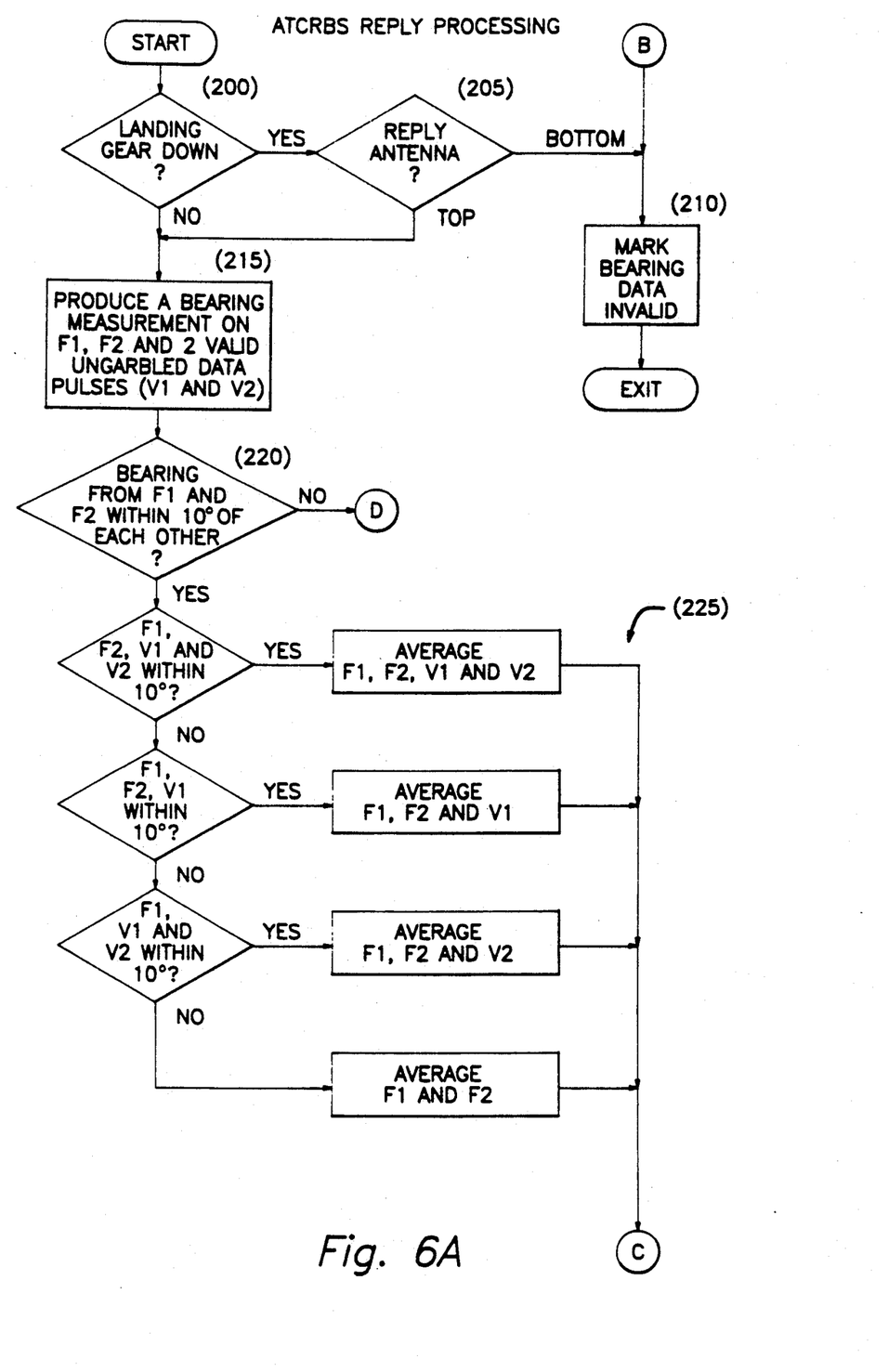
FIGS. 6A and 6B show a functional flow diagram of the ATCRBS reply processing.
Figure 6B:
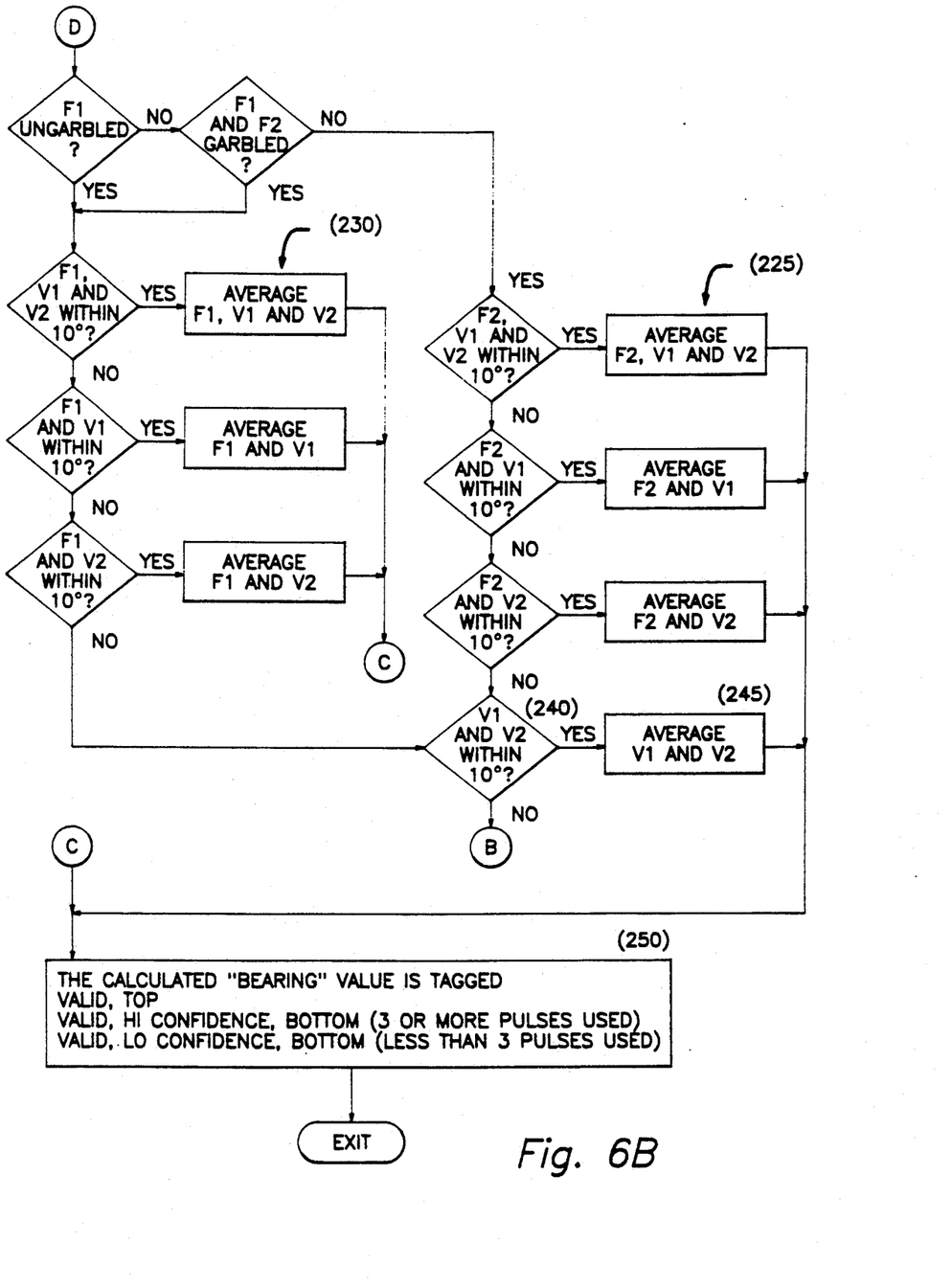

Referring to FIGS. 6 and 6B, there is shown a functional flow diagram of the ATCRBS reply processing. If the landing gear is down (block 200) and the reply is from the bottom antenna (block 205), the bearing data is marked invalid and the processing is exited (block 210). If the landing gear is not down a bearing measurement is determined from the response pulses utilizing the two framing pulses F1, F2 and two other valid ungarbled data pulses (denoted V1 and V2) (block 215). The remainder of the processing is performed to combine the values obtained from the four pulses. However the framing pulses F1 and F2 are utilized when possible. If the bearing measurements produced from F1 and F2 are within 10° of each other (block 220), then one or both of the other data pulses are checked to determine if they are within 10° of each other, and the first combination of bearing within 10° of each other is averaged to produce a bearing measurement BEARING of the reply (block 225). If F1 and F2 bearing are greater than 10° of each other, processing is performed to determine whether F1 or F2 is the better value, the data pulses are compared with the values of F1 (block 230) or F2 (block 235) and the first combination of bearings within 10° of each other is averaged to produce the bearing measurement, BEARING, of the reply. If none of the above combinations produce a bearing measurement for the reply, the processing checks if the two data pulses V1 and V2 are within 10° of each other, and if so, those bearing measurements are averaged and utilized for the bearing measurement of the reply (block 240). If V1 and V2 are not within 10° of each other, then the bearing data is marked as invalid (block 210) and the processing exited. After a BEARING value is generated the value is tagged by priority/ category (block 250). If the bearing measurement is a valid bearing measurement from the bottom antenna in which three or more pulses were used in the bearing measurement averaging, the bearing value, BEARING, is tagged as valid, high confidence, bottom antenna. If less than three pulses were used in the bearing measurement averaging, the BEARING is tagged as a valid, low confidence, bottom antenna bearing measurement. If a valid averaging is obtained from utilizing the top antenna the average value is tagged as valid, top. As mentioned above, the bearing processing is exited; however, prior to exiting the bearing value is stored with the appropriate bearing measurement of the reply, along with the range, altitude,... determined from the response of the interrogation. This target information is stored in the CRL 41 as discussed above for updating the track during the processing period.

During the ATCRBS reply elimination process preliminary to the track updating process, an attempt is made to eliminate or purge duplicate replies from a single intruder.

Figure 7:
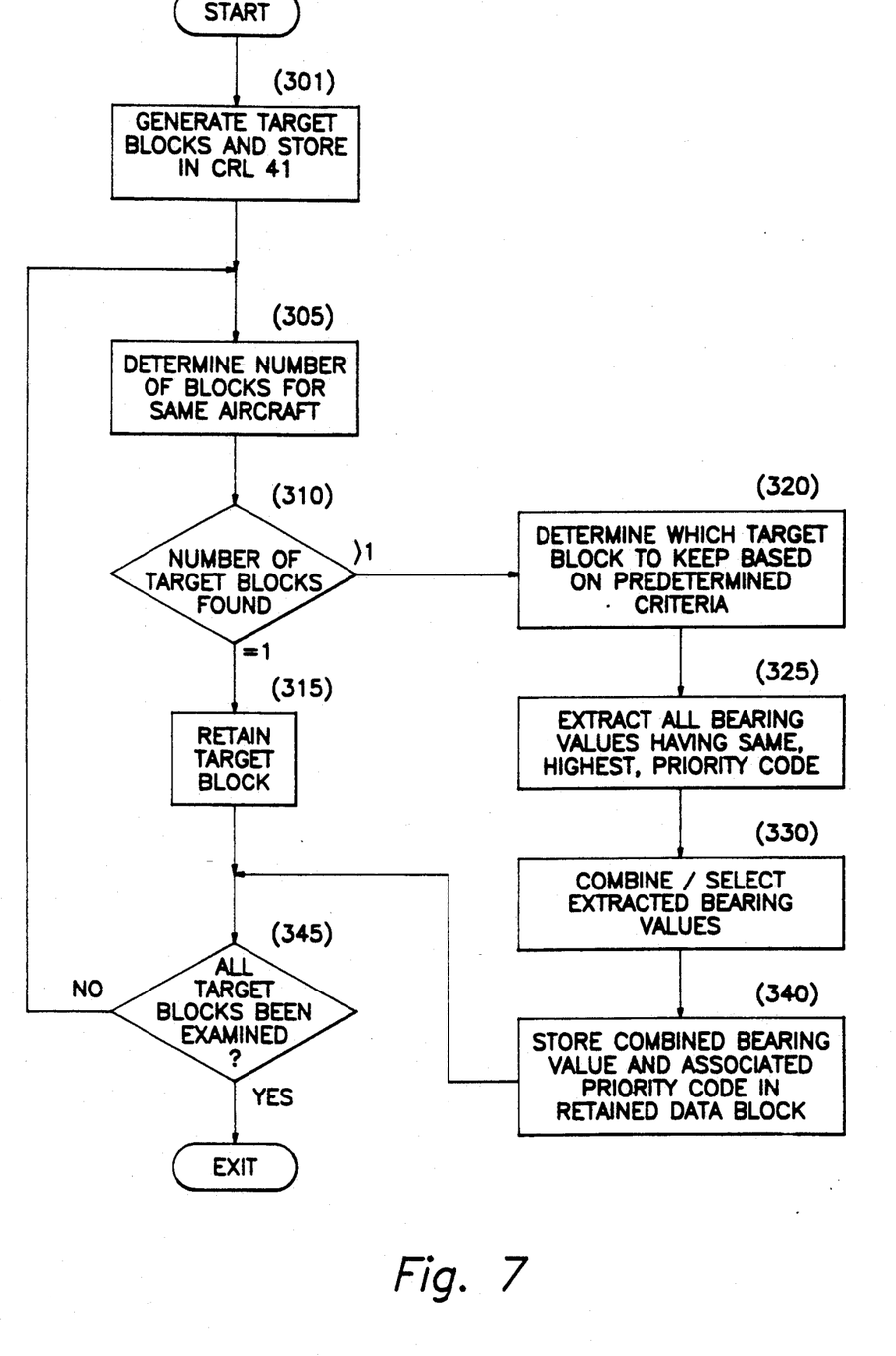
FIG. 7 shows a flow diagram of the elimination processing performed on the response list.

Referring to FIG. 7, there is shown a block diagram of the elimination process of the response list. Replies to the interrogation from a target aircraft are received by the respective antenna and processed by processor 30. The results are saved in the current reply list 41 (block 301).

Once the target to be updated is selected, the replies are searched to determine the number of blocks which exists for the same aircraft (block 305). If the number of blocks found for the target is one (1) (block 310), the target block is retained (block 315), and the processing continues to block 345. If the number of blocks found in the CRL list for the target is greater than 1, a determination is made to determine which target block to keep based on predetermined criteria (block 320), as discussed above.

The bearing data is processed, whereby all bearing values, of the target blocks for the target being processed, having the same highest priority code are extracted (block 325), and combined/selected (block 330), as discussed above. The resultant bearing, as a result of the process of block 330, is stored in the retained target block (along with other associated data of the target such as range and altitude) (block 340). The processing continues at block 345.

If all the target blocks have not been processed (block 345), the processing continues at block 305. If all the target blocks have been processed, the target elimination process is completed and is exited. In this process, higher priority bearing values are given precedence over lower priority bearing values. In the case of ATCRBS altitude reporting intruders, duplicate replies are eliminated. All of the replies are examined pair-wise and for each pair of replies meeting predetermined criteria, one of the replies is eliminated. If the bearing values of the two replies have the same priority level, then the bearing value associated with the reply being kept is retained. If the priority levels of the bearing values of the two replies are different, then the bearing value with the highest priority is used with the reply retained.

In the case of ATCRBS, non-altitude reporting intruders, all replies meeting predetermined criteria (e.g., range window criteria, bearing window criteria, and whisper-shout step criteria) are combined (averaged) to obtain the final reply. In this case, the highest priority level of the bearing values is determined and all bearing values of the replies being combined which have this priority level are averaged to obtain the bearing value associated with the final reply.

When bearing is initialized incorrectly, the target aircraft initially is displayed in the wrong place on the traffic display. The aircraft then migrates around the traffic display until it reaches its correct bearing position. This is a nuisance to the observer (i.e., the pilot) who is trying to visually acquire the intruder. Therefore, it is advantageous to delay bearing track initialization until good bearing measurements can be obtained. Thus, only valid, top antenna bearing values and valid, high confidence, bottom antenna values are used to form (initiate) ATCRBS and Mode-S bearing tracks.

After a track has be initiated, then there are bearing windows which can be used to reject bad bearing values in the update process. Thus it is acceptable to use low confidence bottom antenna bearing measurements to update bearing tracks. However, a smaller bearing window is used when the bearing value is a valid, low confidence, bottom antenna value than when the bearing value is of a higher priority level to help in rejecting bad bearing values. If the bearing value does not fall within the bearing window, then the bearing track is coasted.

In the preferred embodiment of the present invention the bearing window for valid, low confidence, bottom antenna measurements for both ATCRBS and Mode-S intruders is +/− ten degrees centered around the predicted bearing. For valid top antenna bearing values and valid, high confidence, bottom antenna bearing values, the window is centered about the predicted bearing and varies with the consecutive coasts since the last bearing track update, the higher the consecutive coast number the greater the window. A flow diagram of the elimination processing of the replies in CRL 41 (shown in FIG. 1) prior to the track updating process is shown in FIG. 7.

It will be recognized by those skilled in the art that the method of the present invention is not restricted to top and bottom antennas. For example, two top antennas placed at different points on an aircraft could be utilized in which the response of one of the antennas has a higher degree of confidence because of position on the aircraft, transmitted power,... It will be recognized that there are many combinations of antennas (by type, number, placement,...) which can utilize the method of the present invention. It will also be recognized by those skilled in the art that various combining techniques can be used, such as averaging, weighted averaging of all the bearing measurements by priority whereby the highest priority has the highest weighing factor,... within the scope of the invention.

While there has been shown what is considered the preferred embodiment of the present invention, it will be manifest that many changes and modifications can be made therein without departing from the essential spirit and scope of the invention. It is intended, therefore, in the annexed claims, to cover all changes and modifications which fall in the true scope of the invention.

We claim:

1. In an aircraft having a Traffic Alert and Collision Avoidance System (TCAS), said aircraft including a first and second antenna, wherein said aircraft interrogates all target aircraft in the vicinity of said aircraft such that in a surveillance period a predetermined number of interrogations are made during an interrogation portion of the surveillance period, each interrogation being transmitted between said first antenna and said second antenna in a predetermined sequence, said target aircraft responding to each interrogation received such that the same target aircraft responds at least once during a surveillance period, a method for obtaining an optional bearing value for each target aircraft comprising the steps of:
   a) generating a target data block for each response received, each target data block including a measured bearing value and an associated priority code;
   b) storing the generated target data blocks in a response list;
   c) upon completion of the interrogation portion of the surveillance period, determining the target data blocks which relate to the same target;
   d) if only one target data block is found in the response list from step (c),
      i) retaining that target data block; otherwise
   e) if more than one target data block is found in the response list from step (c),
      i) retaining one target data block in the response list based on predetermined criteria;
      ii) combining the measured bearing value of all the target data blocks from step (c) having the same, highest priority code thereby obtaining the optimal bearing value; and
      iii) storing the resultant optimal bearing value of step (e, ii) in the retained target data block, along with the priority code of the measured bearing value used in step (e, ii); and
   f) repeating step (c) until all detectable duplicate target data blocks for each reponding target aircraft have been eliminated from the response list, each remaining target data block having the optimal bearing value and having an associated priority code for tracking each target aircraft.

2. A method for obtaining an optimal bearing value for each target aircraft according to claim 1, wherein the step of generating a target block comprises the steps of:
   a) calculating a return bearing value of each of a predetermined number of pulses received from the interrogation,
   b) if a first predetermined number of return bearing values are within a predetermined number of degrees (in angular measurements of each other, combining each of the return bearing values to obtain the measured bearing value for storing in the target data block, otherwise, setting the measured bearing value to invalid; and c) if the interrogation was from the first antenna, tagging the measured bearing value with a first priority code, otherwise, tagging the measured bearing value with a second priority code, the first priority code having a higher priority than the second priority code.

3. A method for obtaining an optimal bearing value for each target aircraft according to claim 2, further comprising the steps of:

a) before the step of calculating, determining if a predetermined non-obstructive condition of the aircraft exists;

b) if so, continuing with the step of calculating; otherwise, determining if the reply pulses were received from the first antenna; and c) if so, continuing with the step of calculating, otherwise, marking the measured bearing value as invalid.

4. A method for obtaining an optimal bearing value for each target aircraft according to Claim 3, wherein the step of combining each of the return bearing values comprises the step of:

averaging each of the return bearing values.

5. A method for obtaining an optimal bearing value for each target aircraft according to Claim 1, wherein a plurality of reply pulses are received by the aircraft in response to an interrogation, and further wherein the step of generating a target block comprises the steps of:

a) calculating a return bearing value on each of a first predetermined number of reply pulses, wherein the first predetermined number of reply pulses includes a second predetermined number of expected reply pulses;

b) if the first predetermined number of reply pulses are within a predetermined number of degrees of each other, combining each of the return bearing values to obtain the measured bearing value for storing in the target data block, and proceeding to step (e), otherwise;

c) determining those first predetermined number of return bearing values that are within the predetermined number of degrees of each other, d) combining those return bearing values determined from step (c) to obtain the measured bearing value, and if none were determined from step (c), marking the measured bearing value invalid; and e) as a function number of return bearing values utilized to generate the measured bearing value, and the antenna from which the reply pulses were received, assigning a priority code to the measured bearing value stored in the track data bock wherein the highest priority code has the highest degree of confidence in the quality of the measured bearing value.

6. A method for obtaining an optimal bearing value for each target aircraft according to claim 5, further comprising the step of:

a) before the step of calculating, determining if a predetermined non-obstructive condition of the aircraft exists;

b) if so, continuing with the step of calculating; otherwise, determining if the reply pulses were received from the first antenna; and c) if so, continuing with the step of calculating, otherwise, marking the measured bearing value as invalid.

7. A method for obtaining an optimal bearing value for each target aircraft according to claim 6, wherein the step of combining each of the return bearing values comprises the step of averaging each of the return bearing values.

8. A method for obtaining an optimal bearing value for each target aircraft according to claim 1, further comprising the steps of:

a) updating existing tracks wherein the optimal bearing value in the response list is within a predetermined window, said predetermined window being based on said priority code; and b) initiating new tracks from three successive responses utilizing optimal bearing value information in the response list having at least a predetermined priority code.

* * * * *